UNITED STATES PATENT OFFICE.

HARRY WILLIAMS CHARLTON, OF NEW YORK, N. Y.

PROCESS OF ASBESTOS TREATMENT AND PRODUCT THEREOF.

1,256,296. Specification of Letters Patent. Patented Feb. 12, 1918.

No Drawing. Application filed June 28, 1917. Serial No. 177,466.

*To all whom it may concern:*

Be it known that I, HARRY WILLIAMS CHARLTON, a citizen of Canada, residing at New York, in the county of New York, in the State of New York, have invented a new and useful Process of Asbestos Treatment and Product Thereof, of which the following is a specification.

The invention relates to a process of producing modified inorganic fibrous material, which is capable of being more effectively used as a packing and heat-insulating substance than the fibers from which it is prepared. It also possesses the additional advantage of a doubled or trebled weight induced by the addition and combination of inexpensive materials without a deterioration in the quality of the original article.

With this and other objects in view the invention consists in the novel steps and combination of steps constituting the process and in the novel composition of matter constituting the product, all as will be more fully hereinafter disclosed and particularly pointed out in the claims.

In carrying out this invention I preferably employ a material of the nature of asbestos, chrysotile, etc., and add thereto a suitable amount of lime, or equivalent in the form of magnesia or dolomitic lime. This with the addition of a suitable amount of water is digested under superatmospheric pressure and at elevated temperatures. Although I do not wish to limit myself in this respect, I preferably employ a pressure of over 200 pounds and a corresponding temperature. The time of digestion is approximately from one-half to three hours.

It is advisable in every case to have the asbestos "teased" so that all the fibers will be separated, and the resulting asbestos-lime product will be uniform throughout.

On digestion the lime apparently disappears from the solution, and it is found that the weight of the asbestos has increased to an amount equal to the lime originally present. It still retains its original appearance, the fibers being as strong only having a much greater tendency to mat.

The true nature of this material and the chemical changes involved in its formation are difficult to determine. The fact that the asbestos is closely associated with the lime is indisputable. Whether it is a surface combination or forms an integral part of the mass is a difficult matter to decide. The lime is removable by acids, and carbonates on the asbestos. This latter feature is of very great importance when the material is employed as a heat-insulating coating as it becomes permanent.

Another interesting feature is the ease with which the lime may be partially or wholly replaced by other compounds by double decomposition. This permits an almost molecular deposition of catalyzing materials upon the asbestos, either associated with and permeating the chemically active lime on the surface or covering the denuded fiber. By the well known methods of reduction such active catalysts as nickel or its suboxid may be obtained in such a fine colloidal condition that on dissolving out the associated lime they appear as an almost colloidal suspension. An additional feature is the neutralizing action of the lime which would not only check but correct rancidity in case saponifiable oils were being hardened.

It is quite possible that the lime-asbestos combination is due in part to the initial formation of the peculiar hydrate of lime described in my copending application Serial No. 173,104, filed June 6th, 1917. This being very active chemically may unite in some loose way with the asbestos.

That asbestos and lime may be mixed in the form of a paste or cement has been known for many years and a simple mixture of this nature is not claimed in the present application. This is a case in which asbestos fibers exhibit a selective and absorptive action on lime present as a dilute solution of milk of lime. It is a case in which there is a uniform deposition or growth of lime on each strand of the fiber, beginning at the surface and growing outward.

The useful applications of this asbestos-lime compound are many and varied, and are very similar to those of ordinary asbestos, over which it has the additional advantage of less cost. It may be used in preparing asbestos shingles, fireproof curtains, firemen's gloves and other articles of clothing.

Associated and intimately incorporated with asphalt it forms adhesive packing, mineral rubber, etc.

Its surface adhesion and matting properties make it particularly adaptable in the production of asbestos wood, brake-linings, gaskets, asbestos felt, yarn, etc.

There is doubtless some lime present as the peculiar subhydrate and this renders it particularly useful in strengthening stucco.

It has long been known that a gasket is very materially strengthened if the material with which it comes in contact reacts upon it to form an impervious flexible mass. This is the case when oil comes in contact with asbestos-lime.

It may also be used as a high temperature cement. In pipe coverings it mats remarkably well and may readily be incorporated with magnesia.

It is obvious that those skilled in the art may vary the details of the process as well as the product without departing from the spirit of the invention, and therefore I do not wish to be limited to the above disclosures except as may be required by the claims.

I claim:

1. A process of producing a new material which comprises digesting a mineral fibrous material, its fibers having been previously pulled apart, and a compound exhibiting little affinity for the fibers under ordinary conditions, but uniformly adhering to the surface of the fiber when digested with it under pressure and at elevated temperatures; substantially as described.

2. A process of producing a new material which comprises digesting asbestos and milk of lime in an autoclave under pressure; substantially as described.

3. A process of producing a new material which comprises digesting asbestos and milk of lime under a pressure of above 200 pounds and at a corresponding temperature; substantially as described.

4. A process of producing a new material which comprises digesting a mineral fibrous material, its fibers having been previously pulled apart, with an alkali earth hydrate and water, under pressure and at elevated temperature; substantially as described.

5. As a new product a mineral fibrous material, having its individual fibers uniformly coated with an alkali earth hydrate; substantially as described.

6. As a new product asbestos wool whose individual fibers are uniformly coated with lime; substantially as described.

HARRY WILLIAMS CHARLTON.